Aug. 9, 1960  C. M. ASHLEY  2,948,619
METHOD AND APPARATUS FOR BLANCHING FOOD PRODUCTS
Original Filed Nov. 14, 1951
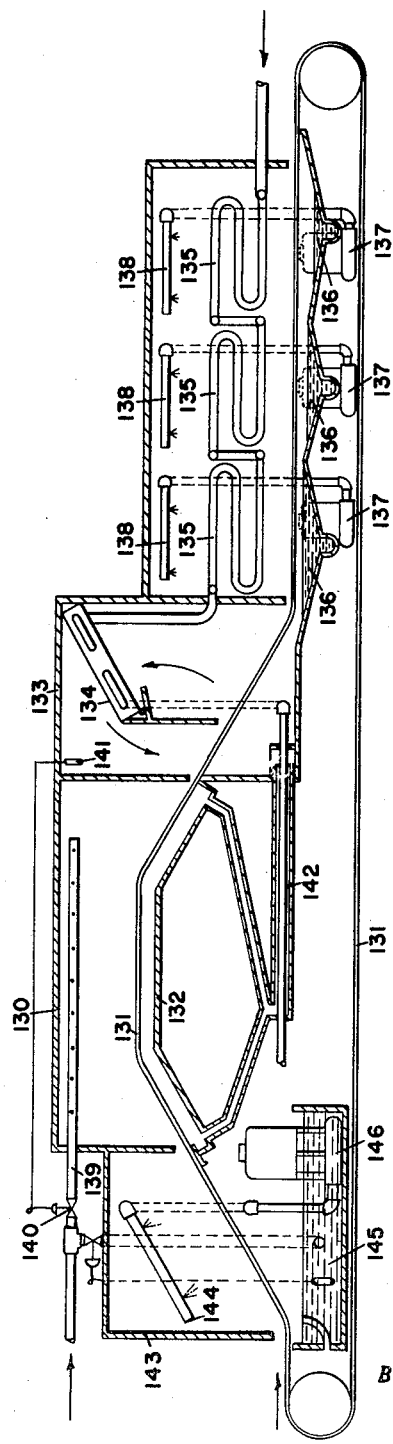
INVENTOR.
CARLYLE MARTIN ASHLEY
BY
ATTORNEY.

United States Patent Office 2,948,619
Patented Aug. 9, 1960

2,948,619

METHOD AND APPARATUS FOR BLANCHING FOOD PRODUCTS

Carlyle Martin Ashley, Fayetteville, N.Y., assignor to Carrier Corporation, Syracuse, N.Y., a corporation of Delaware Original application Nov. 14, 1951, Ser. No. 256,315, now Patent No. 2,870,020, dated Jan. 20, 1959. Divided and this application June 2, 1958, Ser. No. 739,068

9 Claims. (Cl. 99—100)

This application is a division of copending application, Serial No. 256,315, filed November 14, 1951, entitled "Method and Apparatus for Blanching Food Products," now Patent No. 2,870,020. This invention relates to a method of blanching or scalding and subsequent cooling of food products and equipment therefor and, more particularly, to a method of steam blanching food products in which dissolved solids are returned to the food product preferably during the cooling operation and to apparatus for steam blanching food products, collecting dissolved solids, and returning the dissolved solids to the food product during the cooling operation.

In food freezing, either domestic or commercial, it is essential to blanch or scald the food product, particularly vegetables, before the freezing operation to destroy or render inactive the enzymes to prevent the appearance and taste of the frozen product being deleteriously affected. While blanching is conducted to destroy the principal enzymes, overblanching should be avoided.

Blanching has generally been conducted by means of boiling water or steam. Water blanching is not satisfactory for it results in a decrease in the nutritive value of the food product since a large proportion of the juices and dissolved solids such as vitamins and minerals are washed away. It may result in a relative loss in weight in the final product which is extremely serious in commercial applications since the product is sold by weight. The water supply too may affect the texture, appearance, odor, flavor, nutritive value or storage life of the product since it may contain materials injurious to any or all of such factors; to avoid damage to the food product from the water supply, it is customary in larger freezing plants to provide expensive water treatment equipment.

In the steam blanching processes as heretofore conducted, the solids dissolved in the condensate are not returned to the product but are wasted. A further disadvantage rests in the fact that in the processes used heretofore the product is washed with water when it is in a soft, porous condition to cool the same with resulting loss of a considerable additional percentage of solids.

The chief object of the present invention is to eliminate the present disadvantages of steam blanching and water cooling.

An object of the present invention is to provide a method of steam blanching in which nutrients are returned to the food product prior to freezing. The term "nutrients" is used herein to designate dissolved solids such as minerals, vitamins, proteins, carbohydrates, etc.

A further object is to provide a method of steam blanching in which nutrients are returned to the food product during the cooling operation.

A still further object is to provide a method of blanching in which steam is introduced and air and other non-condensible gases are removed in such manner that a minimum of oxygen is in contact with the heated food product to cause oxidation.

A still further object is to prevent the reintroduction of bacteria to the heat-sterilized food product by contact with non-sterile water.

A still further object is to provide apparatus for steam blanching and subsequent cooling of food products adapted for commercial use.

A still further object is to provide blanching apparatus in which condensate is removed from the food product at the end of the heating operation.

A still further object is to provide apparatus to blanch a food product and to cool the same while returning dissolved solids and juices thereto to restore its original weight, flavor and appearance. Other objects of the invention will be readily perceived from the following description.

This invention relates to a method of blanching and cooling food products in which the steps consist in placing a heated vapor in contact with the food product to heat the same, collecting nutrients given off by the food product during the heating operation, cooling the heated food product and distributing the collected nutrients over the food product to restore substantially the original nutrients, including vitamins and minerals.

This invention further relates to apparatus for blanching and cooling food products which comprises, in combination, means for supplying a heated vapor over the food product to heat the same thereby condensing at least a portion of the vapor, means for collecting at least a portion of the nutrients given off by the food product when it is contacted by the vapor, and means for distributing at least a portion of the collected nutrients over the food product to restore a substantial portion of the original nutrient content.

The attached drawing illustrates a preferred embodiment of the invention, in which the single figure is a diagrammatic view of a blanching and cooling device for commercial use.

In the figure, I have illustrated a blanching device suitable for commercial blanching operations. The device comprises an inverted steam chamber 130 through which a continuous conveyor belt 131 carrying the food product passes. A drain pan 132 is placed in chamber 130 below belt 131. A second chamber 133 is connected to chamber 130. If desired, chamber 133 may form a portion of chamber 130, being separated from chamber 130 by a partition. A cooling coil 134 is placed in the upper portion of chamber 133.

Cooling mechanism for the food product is provided adjacent chamber 133. The cooling mechanism may comprise a series of cooling coils 135 placed above belt 131; condensate pans 136 are placed below belt 131; pumps 137 are provided to supply condensate from each of pans 136 to nozzles 138 which spray the condensate over the accompanying cooling coils 135 so that cooled condensate is distributed over the food product on belt 131 at each of such stations. Three cooling stations are shown; it will be understood as many similar cooling stations may be provided as may be found necessary.

Steam is injected into chamber 130 through line 139. A valve 140 in line 139 regulates supply of steam to chamber 130. Valve 140 is actuated by means of a bulb 141 placed in chamber 133 responsive to the temperature of a mixture of vapor and air therein as hereinafter described. Steam is injected into chamber 130 in a manner to avoid jetting onto the food product and to avoid turbulence therein.

Considering the operation of the device, the food product to be blanched is placed on conveyor 131 and is carried upward into chamber 130 through the chamber and downward on the opposite end. The level of vapor in chamber 130 is maintained by means of the cooling coil in chamber 133 at the exit end of chamber 130 and by valve 140. A mixture of steam and air rises through forces of gravity and passes over coil 134 where the mixture is cooled and a portion of the vapor extracted. The mixture then circulates through the food product on belt 131, partially cooling the food product and returning again to the entrance side of chamber 133, rising through the food product and again being cooled by coil 134. It will be appreciated bulb 141 is responsive to the temperature of the steam vapor-air mixture in chamber 133 since it is placed adjacent the upper end of chamber 133.

Condensate from the food porduct being blanched in chamber 130 is collected and forwarded through line 142 to the first pan 136. Pump 137 forwards condensate from pan 136 to nozzle 138 which sprays the condensate over cooling coil 135, condensate being then distributed over the food product on belt 131. Any excess condensate overflows into a second pan 136, the process being repeated at as many stations as may be necessary. Cooling water is passed in counterflow relation through the various coils at the cooling stations and through coil 134 in chamber 133. If desired, condensate flowing from drain pan 132 may be passed in heat exchange relation with cooling water leaving coil 134.

This procedure is particularly desirable since the original weight of the product is substantially increased by absorption of juice by the softened food and the juices and dissolved solids are returned to the blanched and cooled food product. An advantage resides in the fact that only a small quantity of condensate is retained in the cooling systems so that loss of condensate is minimized when the equipment is cleaned.

For some food products, it may be desirable to wash the same with warm water before the product is blanched. For this purpose, I provide a chamber 143 placed immediately prior to chamber 130. Nozzles 144 are provided in the chamber; the base of the chamber forms a sump 145 in which water may be heated. The heated water may be supplied to nozzles 144 by means of a pump 146. The heated water is sprayed over the surface of food product on belt 131 and serves to remove undesirable materials from the surface thereof.

If desired, the leading edge of drain pan 132 may be retracted to permit the initial condensate to be deflected to a separate drain. Little water soluble material will be lost in this condensate because the food product is usually too firm to permit leaching until it is softened by further heating. I have found too that some evaporation may occur in chamber 133, since the mixture of cooled air and vapor passing in heat exchange relation with food product on belt 131 cools the same, permitting some evaporation of condensate on the surfaces of the food product.

The present invention provides a simple, ready, economical method of blanching food products and cooling the same which may be practiced in commercial blanching operations. The method provided by my invention assures that juices and dissolved solids are returned to the food product before freezing and restores substantially the initial weight of the product, which is of particular value in commercial operations.

It will be appreciated if the food product is heated through the same range as it is cooled, substantially no change in weight of the food product will occur. The food will absorb substantially all of the juices since heating followed by cooling increases the absorptive capacity.

While I have described a preferred embodiment of the invention, it will be understood the invention is not limited thereto since it may be otherwise embodied within the scope of the following claims.

I claim:
1. In the method of continuously blanching and cooling food products, the steps which consist in placing the food product on a conveyor, passing the food product on the conveyor through an inverted steam chamber to blanch the same, automatically manitaining the supply of steam in the chamber, collecting at least a portion of the condensate and nutrients given off by the food product in the chamber, passing the food product into a cooling chamber and distributing the collected condensate and nutrients over the food product on the conveyor.

2. In the method of continuously blanching and cooling food products, the steps which consist in placing the food product on a conveyor, passing the food product on the conveyor through an inverted steam chamber to blanch the same, automatically maintaining the supply of steam in the chamber, collecting at least a portion of the condensate and nutrients given off by the food product in the chamber, cooling the collected mixture, and spraying the cooled mixture over the surfaces of the food product on the conveyor, collecting the portion of the sprayed mixture not absorbed by the food product, cooling the collected sprayed mixture, and again spraying the same over the surfaces of the food product in a succeeding stage.

3. A method of continuously blanching and cooling food products according to claim 2 in which the collection of condensate is controlled to maintain a desired quantity of condensate and nutrients in the last cooling stage.

4. In apparatus for processing food products, the combination of a conveyor for the food product to be processed, an inverted steam chamber through which the food product moves on the conveyor, a member for collecting at least a portion of the condensate and the nutrients given off by the food product in the chamber, and means for distributing the collected condensate and nutrients over the surfaces of the food product on the conveyor after the product has moved from the chamber.

5. In apparatus for processing food products, the combination of a conveyor for the food product to be processed, an inverted steam chamber through which the food product moves on the conveyor, a member for collecting at least a portion of the condensate and nutrients given off by the food product in the chamber, means for distributing the collected condensate and nutrients over a food product on the conveyor during cooling thereof, a second chamber connected to the steam chamber, a cooling coil in said second chamber, an air-vapor mixture circulating in said second chamber through the coil and serving to precool the blanched food product, and means for further cooling the blanched food product.

6. Apparatus according to claim 5 in which means are provided for supplying steam to the steam chamber in response to change in temperature of the air-vapor mixture in the second chamber.

7. Apparatus according to claim 6 in which the cooling means comprise a cooling coil, a sump beneath the conveyor for condensate and nutrients, spray members, a pump to circulate condensate and nutrients from the sump to the spray members and to distribute the same through the cooling coil over the surfaces of the food product on the conveyor, a second sump receiving overflow from the first sump, a second coil, second spray members, and a second pump to circulate condensate and nutrients from the second pump to the second spray members and to distribute the same through the second cooling coil over the surfaces of the food product on the conveyor.

8. Apparatus according to claim 7 in which the collected condensate is placed in heat exchange relation wtih cooling medium leaving the coil in the second chamber.

9. Apparatus according to claim 8 in which means are provided immediately in advance of the steam chamber for washing the food product with heated liquid medium.

References Cited in the file of this patent

UNITED STATES PATENTS

| | | | |
|---|---|---|---|
| 959,448 | Baxter | May 31, | 1910 |
| 1,720,491 | Parker | July 9, | 1929 |
| 2,355,798 | Guthier | Aug. 15, | 1944 |
| 2,373,521 | Wigelsworth | Apr. 10, | 1945 |
| 2,403,871 | McBean | July 9, | 1946 |
| 2,418,519 | McBeth | Apr. 8, | 1947 |
| 2,515,879 | Korn | July 18, | 1950 |
| 2,522,513 | Hemmeter | Sept. 19, | 1950 |
| 2,581,484 | Helgerud | Jan. 8, | 1952 |
| 2,692,200 | Olson | Oct. 19, | 1954 |
| 2,870,020 | Ashley | Jan. 20, | 1959 |